(12) United States Patent
Heinz et al.

(10) Patent No.: US 9,873,157 B2
(45) Date of Patent: Jan. 23, 2018

(54) SAWING APPARATUS FOR SAWING WORKPIECES OF WOOD, PLASTIC MATERIAL AND THE LIKE

(71) Applicant: Weinig Dimter GmbH & Co. KG, Illertissen (DE)

(72) Inventors: Alois Heinz, Unterroth (DE); Georg Reinbold, Biberach (DE)

(73) Assignee: Weinig Dimter GmbH & Co. KG, Illertissen (DE)

( * ) Notice: Subject to any disclaimer, the term of this patent is extended or adjusted under 35 U.S.C. 154(b) by 116 days.

(21) Appl. No.: 15/088,214

(22) Filed: Apr. 1, 2016

(65) Prior Publication Data

US 2016/0288226 A1  Oct. 6, 2016

(30) Foreign Application Priority Data

Apr. 1, 2015  (DE) .................... 20 2015 002 508 U

(51) Int. Cl.
| | |
|---|---|
| *B23D 45/02* | (2006.01) |
| *B23D 45/06* | (2006.01) |
| *B23D 47/08* | (2006.01) |
| *B23D 47/02* | (2006.01) |
| *B23D 47/12* | (2006.01) |
| *B23D 59/00* | (2006.01) |

(52) U.S. Cl.
CPC ......... *B23D 45/024* (2013.01); *B23D 45/068* (2013.01); *B23D 47/02* (2013.01); *B23D 47/08* (2013.01); *B23D 47/12* (2013.01); *B23D 59/001* (2013.01)

(58) Field of Classification Search
CPC .... B23D 45/024; B23D 59/001; B23D 47/12; B23D 47/02; B23D 47/08; B23D 45/068
USPC .................................................. 83/471.2, 490
See application file for complete search history.

(56) References Cited

U.S. PATENT DOCUMENTS

| | | | | |
|---|---|---|---|---|
| 2,299,262 | A | * | 10/1942 | Uremovich ............. B27B 5/243 83/473 |
| 2,505,958 | A | * | 5/1950 | Grierson ................ B23D 47/08 144/134.1 |
| 2,661,777 | A | * | 12/1953 | Hitchcock ............... B27B 5/243 474/114 |
| 3,011,529 | A | * | 12/1961 | Copp ...................... B27B 5/243 83/473 |

(Continued)

FOREIGN PATENT DOCUMENTS

| | | |
|---|---|---|
| DE | 40 04 705 A1 | 8/1990 |
| EP | 1 815 930 A1 | 8/2007 |

*Primary Examiner* — Sean Michalski
(74) *Attorney, Agent, or Firm* — Gudrun E. Huckett

(57) ABSTRACT

A sawing apparatus for sawing workpieces of wood or plastic material has an adjustable frame part and a drive motor. A circular saw blade is operatively connected to the drive motor and drivable in rotation by the drive motor about an axis of rotation of the circular saw blade. The circular saw blade is adjustable from a ready position into a working position. The ready position is selected as a function of a position of the adjustable frame part such that the circular saw blade carries out a minimized angular travel as working travel during sawing. The adjustable frame part is adjustable at least in a vertical direction and/or in a horizontal direction transverse to the axis of rotation of the circular saw blade as a function of a cross-section of a workpiece to be sawed.

24 Claims, 6 Drawing Sheets

(56) References Cited

U.S. PATENT DOCUMENTS

| | | | | |
|---|---|---|---|---|
| 4,336,733 A | * | 6/1982 | Macksoud | B23Q 1/0009 |
| | | | | 144/285 |
| 4,365,530 A | * | 12/1982 | Johnson, Jr. | B23D 45/065 |
| | | | | 83/329 |
| 5,819,625 A | * | 10/1998 | Sberveglieri | B23D 45/062 |
| | | | | 83/102.1 |
| 5,875,698 A | | 3/1999 | Ceroll et al. | |
| 6,463,837 B2 | * | 10/2002 | Andersen | B27B 5/202 |
| | | | | 83/471.2 |
| 6,968,767 B2 | * | 11/2005 | Yu | B23D 45/067 |
| | | | | 83/473 |
| 8,489,224 B2 | * | 7/2013 | Berman | G05B 19/4093 |
| | | | | 700/159 |
| 9,623,498 B2 | * | 4/2017 | Gass | B23D 45/067 |
| 2003/0101857 A1 | * | 6/2003 | Chuang | B23D 45/065 |
| | | | | 83/477.1 |
| 2006/0032352 A1 | * | 2/2006 | Gass | B23D 59/001 |
| | | | | 83/58 |
| 2006/0288836 A1 | | 12/2006 | Wang et al. | |
| 2011/0048191 A1 | | 3/2011 | Chung et al. | |

* cited by examiner

SAWING APPARATUS FOR SAWING WORKPIECES OF WOOD, PLASTIC MATERIAL AND THE LIKE

BACKGROUND OF THE INVENTION

The invention concerns a sawing apparatus for sawing workpieces of wood, plastic material and the like, comprising at least one circular saw blade that is drivable in rotation by a drive motor and is adjustable from a ready position into a working position.

Sawing apparatus are known with which elongate workpieces of wood are sawed in order to either bring them to a certain length or in order to remove defects and/or bad wood qualities from the workpieces. As long as workpieces with the same cross-section are fed to the sawing apparatus, the workpieces can be sawed within a short period of time. However, it happens frequently that workpieces with changing cross-sections are sequentially supplied to the sawing apparatus. In this case, always the same sawing blade stroke is employed for sawing the workpieces of different widths and/or thickness so that no high throughput of the sawing apparatus can be achieved.

The invention has the object to configure the sawing apparatus of the aforementioned kind such that a high throughput of workpieces to be sawed can be achieved with it.

SUMMARY OF THE INVENTION

In accordance with the invention, this object is solved for the sawing apparatus of the aforementioned kind in that the ready position of the circular saw blade is selected as a function of the position of an adjustable frame part in such a way that the circular saw blade carries out a minimized angular travel as working travel during sawing.

The sawing apparatus according to the invention is characterized in that the ready position of the circular saw blade is selected as a function of the position of an adjustable frame part such that the circular saw blade carries out a minimized angular travel as a working travel during the sawing process. The workpieces can therefore be sawed in a short period of time because the ready position of the circular saw blade is always optimally adjusted as a function of the cross-sectional shape of the workpiece.

The sawing apparatus according to the invention has the frame part which can be adjusted in vertical and/or horizontal direction transversely to the axis of rotation of the circular saw blade as a function of the cross-section of the workpiece to be sawed. On the frame part, the drive for the circular saw blade is provided which is appropriately adjusted by adjustment of the frame part. In this way, it is possible to adjust the stroke and thus also the sawing time as a function of the cross-section of the workpiece to be sawed. In this way, the workpieces can be optimally sawed within a short period of time. The sawing apparatus according to the invention is characterized therefore by a high throughput and only minimal sawing times.

It is advantageous when in addition the axis of rotation of the circular saw blade is rotatably and eccentrically supported in a rotor which is also provided on the adjustable frame part and whose axis of rotation is positioned parallel to the axis of rotation of the circular saw blade. In this way, there is the possibility to adjust the initial position of the circular saw blade in the ready position precisely to the cross-section of the workpiece to be sawed. Accordingly, in combination with the adjustment of the frame part, the sawing time for the respective workpiece can be optimized. By rotation of the rotor, the axis of rotation of the circular saw blade is moved in circulation about the axis of rotation of the rotor. This circulating movement of the axis of rotation of the circular saw blade provides the required sawing stroke for sawing through the workpiece. Due to the circular movement of the rotor, the effective lever arms and torques in any circular position remain approximately the same which has a positive effect on the operation of the circular saw blade.

Depending on the cross-sectional shape of the workpiece, the axis of rotation of the circular saw blade relative to the axis of rotation of the rotor in the ready position is adjusted such that the workpiece can be sawed with minimal sawing stroke and thus in a short period of time.

In an advantageous embodiment, the circular saw blade in the ready position is in the area below a transport path for the workpiece. Therefore, there is the possibility that the workpiece can be moved across the circular saw blade on the transport path without the workpiece being sawed.

The required stroke of the circular saw blade required for sawing through the workpiece is generated by rotational movement of the rotor, the saw blade during the stroke movement being continuously driven in rotation. As a result of the rotational movement of the rotor, the circular saw blade projects past the transport path of the workpiece only across a certain angular range of the movement path of the axis of rotation of the circular saw blade about the axis of rotation of the rotor wherein then the sawing cut is performed. As soon as the circular saw blade drops below the transport path again, the workpiece can already be transported farther while the circular saw blade upon further rotation of the rotor is returned into the ready position. This leads to a significant savings in time when workpieces that are different are to be sawed in sequence.

For a maximum cross-section of the workpiece to be sawed, it is possible by rotation of the rotor to cause circulation of the axis of rotation of the circular saw blade about a great angular range about the axis of rotation of the rotor. The angular range can be greater than 300° in such a case.

The thinner the workpiece to be sawed, the smaller the sawing stroke that must be performed by the circular saw blade. In the ready position, it can be adjusted such that the axis of rotation of the circular saw blade has an appropriate minimal spacing from the transport path of the workpiece.

Depending on the cross-section (thickness and/or width) of the workpiece, the axis of rotation of the circular saw blade in the ready position is adjusted relative to the transport direction or to the axis of rotation of the rotor. In this way, the ready position of the circular saw blade can be adjusted optimally such that the workpiece is sawed within a short period of time.

In an advantageous embodiment, the circular saw blade is drivable by at least one belt drive. It represents a constructively simple and inexpensive possibility for driving in rotation the circular saw blade by means of an appropriate drive motor.

Of course, instead of a belt drive also any other suitable rotary drive for the circular saw blade can be provided, for example, a gear drive.

Advantageously, the rotor is also driven by at least one belt drive. For the rotor, any other suitable rotary drive can also be employed, for example, a gear drive.

The drives for the circular saw blade and the rotor are advantageously connected to a control unit. With it, it is possible to control the corresponding drives in the desired way in order to generate the stroke movement of the saw blade by rotation of the rotor or, for example, to adjust the circular saw blade into a certain ready position.

In a constructively simple embodiment, the rotor is provided with a hollow wheel across which at least one endless belt is guided.

The belt drive for the circular saw blade is located advantageously in the area outside of the hollow wheel.

In order to minimize possible splinter formation on the workpiece by the sawing process, it is advantageous when the rotary speed of the rotor is controllable.

In a preferred embodiment, the axis of rotation of the circular saw blade and a shaft of the belt drive for the circular saw blade are connected to each other by at least one length-changeable coupling unit.

A coarse adjustment of the circular saw blade into the ready position is possible in an advantageous embodiment when the frame part is pivotable about an axis which is parallel to an axis of rotation of the circular saw blade.

The subject matter of the application not only results from the subject matter of the individual claims but also from all disclosures and features disclosed in the drawings and the description. Even if they are not subject matter of the claims, they are considered to be important to the invention inasmuch as they are novel, individually or in combination, relative to the prior art.

Further features of the invention result from the additional claims, the description, and the drawings.

BRIEF DESCRIPTION OF THE DRAWINGS

The invention will be explained in more detail with the aid of an embodiment illustrated in the drawings. It is shown in.

DESCRIPTION OF PREFERRED EMBODIMENTS

Figure 1:
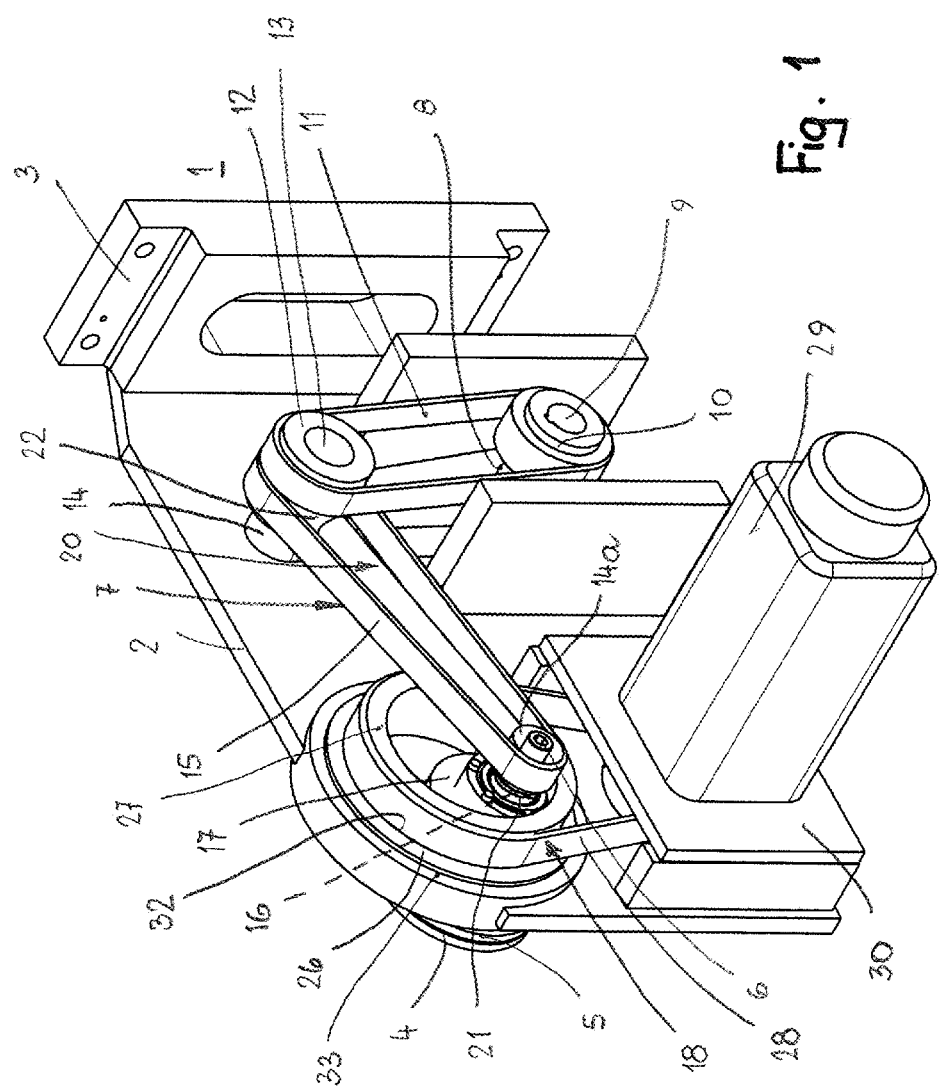
FIG. 1 a perspective illustration of a sawing apparatus according to the invention.

Workpieces of wood, plastic material or the like are sawed by means of the sawing apparatus. In particular, elongate workpieces of wood are sawed to smaller workpieces of wood. In this context, it is possible to saw the workpieces into workpiece parts of the same size. However, the sawing apparatus can also be used to saw out defects and/or bad qualities from the workpieces. For this purpose, the workpieces of wood are first measured and the defects to be cut out are marked. This can be done manually but also, for example, by means of scanners in an automated fashion. The defects to be cut out, for example, knots or bad wood qualities, are compiled in a cutting list and transmitted from the measuring station to a control unit that controls the sawing apparatus such that the workpiece of wood is stopped at the required location in order to saw out the defect and/or the bad wood quality.

The saw blade 34 (FIG. 2) that is advantageously a circular saw blade, is located first in a rest or ready position when no saw cut is to be performed. When a saw cut is to be performed on the workpiece, the saw blade 34 is moved out of the ready position and, in doing so, the saw cut is performed. In order for the sawing apparatus to have a high performance, the adjustment of the saw blade 34 into the ready position is matched to the cross-section of the workpiece 47 to be sawed. Accordingly, only minimal strokes of the saw blade are required in order to perform the saw cut.

The sawing apparatus has a frame 1 that comprises two plate-shaped frame parts 2, 3 that in an exemplary fashion are arranged at a right angle to each other. The circular saw blade 34 is clamped in an exemplary fashion between two circular clamping discs 4, 5 which are seated fixedly on a shaft 6. The saw blade or the clamping discs 4, 5 are driven in rotation by a rotary unit 7. It has a drive motor 8 which is fastened to the frame part 2 and which is preferably an AC motor. On its drive shaft 9, a belt pulley 10 is fixedly seated. It is connected by means of at least one endless belt 11 with a belt pulley 12 that is seated fixedly on a shaft 13 which is parallel to the drive shaft 9. Adjacent to the belt pulley 12, a further belt pulley 14 is seated fixedly on the shaft 13 and is in drive connection by at least one endless belt 15 with a belt pulley 14a. It is seated on a shaft 16 that extends parallel to the shaft 13 and is supported rotatably in a rotor 17. It is part of a lifting unit 18 by means of which the saw blade stroke can be adjusted. The two belt drives 10 to 12, 14, 15, 14a extend transversely to each other, preferably approximately at a right angle to each other.

Figure 2:
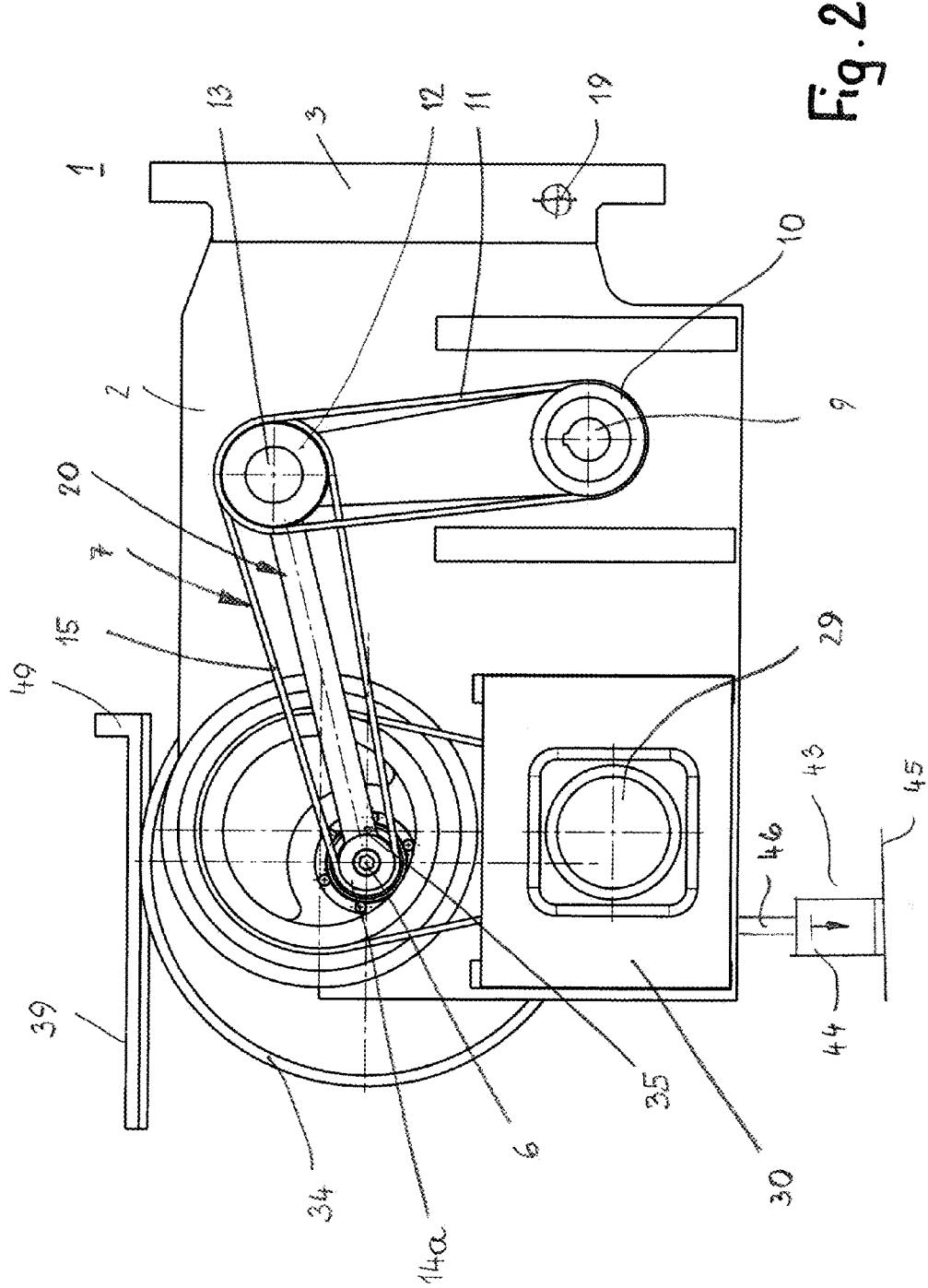
FIG. 2 a schematic illustration of the movement sequence of saw blade and rotor of the sawing apparatus during sawing and during adjustment of the sawing stroke.

The frame part 2 is connected to be pivotable about an axis 19 with the frame part 3. The pivot axis 19 is positioned parallel to the drive shaft 9. An end area thereof that is facing away from the frame part 3 is engaged by a lifting unit 43 (FIG. 2). It comprises at least one lifting gear 44 that is supported on the ground 45. By retracting or extending a lifting unit 46 which is pivotably connected with the frame part 2, the frame part 2 can be pivoted about axis 19 relative to the frame part 3.

The shaft 16 on which the belt pulley 14a of the endless belt 15 is seated is supported eccentrically on the rotor 17. When therefore the rotor 17 is rotatably driven about its axis 35 (FIG. 2), the shaft 6 moves in a circular arc about the axis of rotation of the rotor 17.

In order for the saw blade to be driven reliably in rotation, the belt pulleys 10, 12, 14, 14a are advantageously toothed belt wheels across which the endless belts 11, 15 embodied as toothed belts are guided.

The belt pulleys 10, 12 have advantageously the same diameter. The belt pulley 14a has advantageously a smaller diameter than the belt pulley 14 so that the belt drive 14, 15, 14a forms a step-up gear stage.

The two shafts 6, 13 are connected to each other by a coupling unit 20. It is length-adjustable so that it can be precisely adjusted to the spacing between the two shafts 6, 13. The coupling unit 20 is provided at one end with a bearing 21 in which the shaft 6 is rotatably supported. The other end of the coupling unit 20 is provided with a bearing eye 22 through which the shaft 13 is extending. In the area between the bearing 21 and the bearing eye 22, an adjusting element (not illustrated) is provided that, for example, is a threaded sleeve engaged by a threaded rod that is projecting away from the bearing 21. By rotation of the threaded sleeve, the length of the coupling unit 20 can be adjusted continuously. The coupling unit 20 is seated axially secured on the shaft 6 or 13.

The rotor 17 is supported rotatably in a receptacle 26 which is provided on the frame part 2. The rotor 17 has a hollow wheel 27 that serves as a belt pulley and across which at least one endless belt 28 is extending. It is advantageously a toothed belt which ensures slip-free drive action of the rotor 17. The hollow wheel 27 is seated on the axis of rotation 35 of the rotor 17.

A drive motor 29 serves for driving the hollow wheel 27 and is projecting transversely from a flange 30 which is attached in a suitable way to the frame 1 or to the frame part 2. The flange 30 is positioned at a spacing to the frame part 2. In the intermediate space which is formed in this way the endless belt 28 is extending. The flange 30 is advantageously formed as a rectangular plate. On the drive shaft of the drive motor 29 a belt pulley (not illustrated) is seated across which the endless belt 28 is guided. The belt pulley of the drive motor 29, the endless belt 28, and the hollow wheel 27 form a step-down gear stage.

The shaft 6 has such a length that the belt pulley 16 as well as the bearing 21 are positioned in the area adjacent to the hollow wheel 27 in axial direction. It is supported rotatably in a receiving opening 32 of the receptacle 26. For axial securing of the hollow wheel 27, a securing ring 33 which is, for example, screwed on the end face of the receptacle 26 is provided and serves as a stop for a radial flange of the hollow wheel 27 which is positioned within the receptacle 26.

In the sawing operation, the saw blade is advantageously continuously driven. Even during the stroke adjustment of the saw blade the rotary drive action is not interrupted. When the workpieces 47 to be sawed are transported into the area of the sawing apparatus, the saw blade 34 first assumes its ready position. In the embodiment, the saw blade 34 is then located in the area below the transport path 39 of the workpiece 47 to be sawed. The transport of the workpiece is performed in the direction of the shaft 6. During transport, the workpiece 47 with one of its longitudinal sides 48 extending in the transport direction is resting against a stop rail 49. By means of the circular saw blade 34, the workpiece 47 is sawed perpendicularly to the transport direction.

For sawing the workpiece 47, the drive motor 29 is switched on so that the rotor 17 is driven in rotation about its axis. Since the shaft 6 is supported eccentrically on the rotor 17, the saw blade 34 upon rotation of the rotor 17 is moved along a circular arc about the axis of rotation 35 of the rotor 17.

Figure 3:
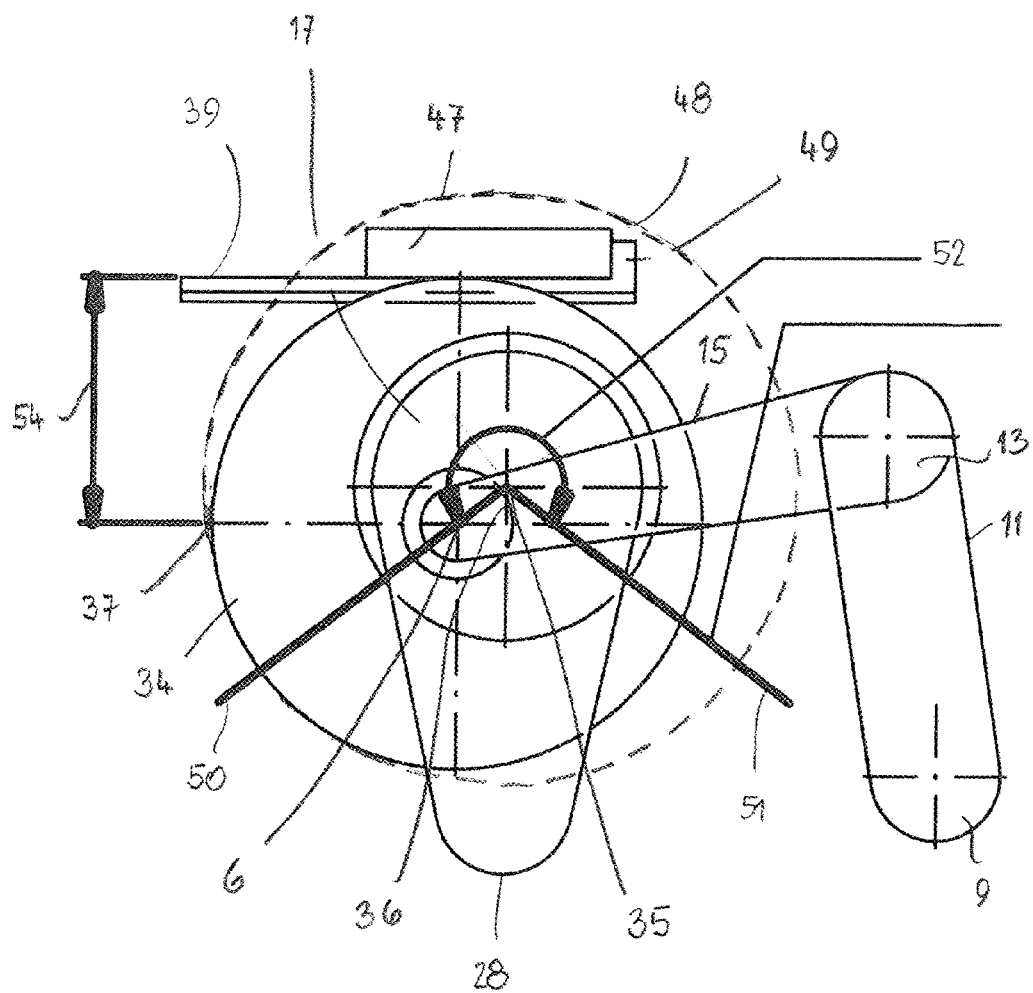
FIG. 3 a first ready position of the saw blade for workpieces with different cross-sectional shape.

The axis of the shaft 6 and the axis of rotation 35 of the rotor 17 are displaced relative to each other by the eccentric length 36. In FIG. 3, in dashed lines the cutting circle 38 is illustrated that a point 37 positioned on the circumference of the circular saw blade 34 describes upon rotation of the rotor 17 about its axis 35. The eccentric length 36 is provided such that the workpiece 47 is completely sawed through while the stroke of the circular saw blade 34 is minimal. The line 50 indicates the ready position of the circular saw blade 34 in which the circular saw blade 34 barely touches the underside of the workpiece 47 or has only a minimal spacing relative to the workpiece 47. The line 50 extends through the axis of rotation 35 of the rotor 17 as well as the axis of rotation 6 of the circular saw blade 34.

With the other straight line 51 the dropped position of the saw blade 34 is identified when the circular saw blade has just left the workpiece 47.

The movement path 52 of the axis of rotation 6 of the circular saw blade 34 about the axis of rotation 35 of the rotor 17 is approximately 260° in the illustrated embodiment.

Since the axis of rotation 6 of the circular saw blade 34 rotating about this axis during the sawing process carries out a circulating movement about the axis of rotation 35 of the rotor 17, the effective lever arms and torques in any circle angle position of the saw blade 34 are approximately identical so that an optimal sawing cut can be performed.

In the position according to FIG. 3, the axis of rotation 6 of the circular saw blade 34 is positioned relative to the axis of rotation 35 of the rotor 17 in such a position that the straight line 50 is in a 7 o'clock position. It is determined by the thickness and width of the workpiece 47 to be sawed. The spacing 54 between the axis of rotation 6 of the circular saw blade 34 and the transport path 39 is matched to the thickness and the width of the workpiece 47.

Figure 4:
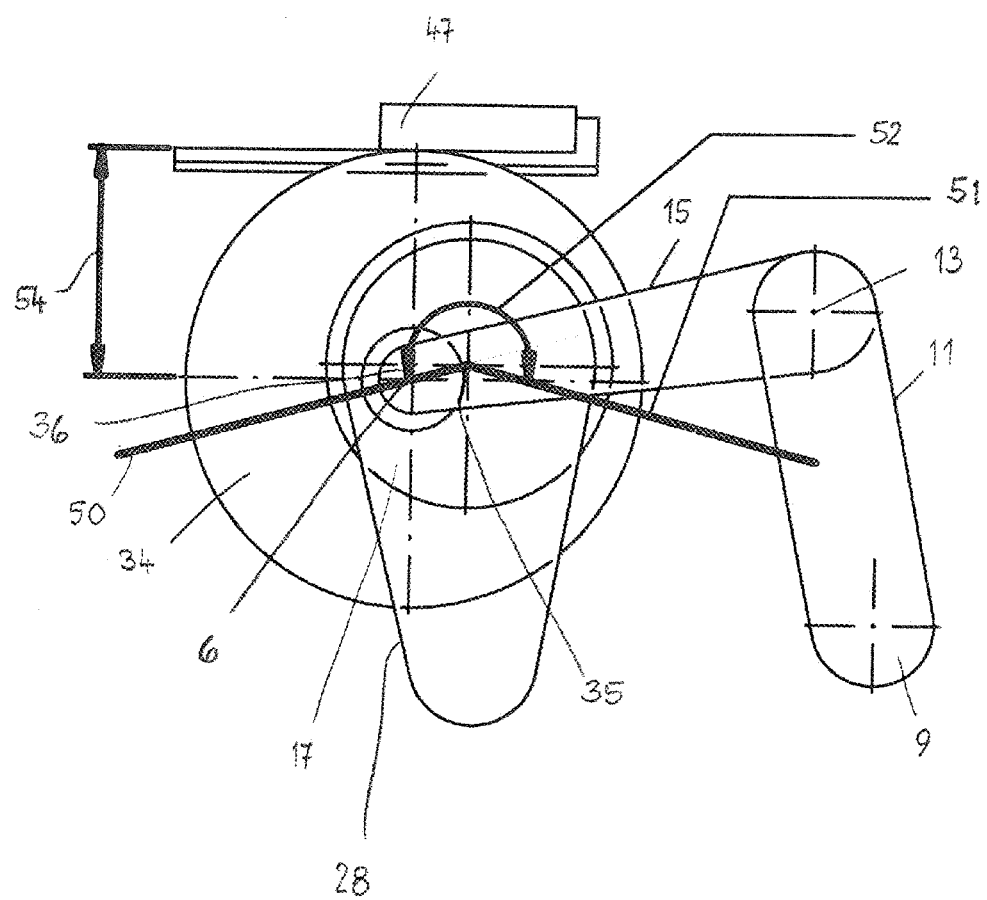
FIG. 4 a second ready position of the saw blade for workpieces with different cross-sectional shape.

FIG. 4 shows in an exemplary fashion the case that the workpiece 47 to be sawed has the same thickness as the workpiece according to FIG. 3 but is narrower than this workpiece. For this reason, the axis of rotation 6 of the circular saw blade 34 is adjusted relative to the axis of rotation 35 of the rotor 17 such that the spacing 54 is smaller than in the position according to FIG. 3. In order to adjust this spacing, the rotor 17 is rotated so far about its axis 35 that the axis of rotation 6 of the circular saw blade 34 has the required spacing 54 to the transport path 39. In the ready position (straight line 50) the circular saw blade 34 is resting against the underside of the workpiece 47 or has only a minimal spacing thereto. The circular saw blade 34 is rotatably driven by means of the described belt drives 10 to 12 and 14, 14a, 15 about its axis 6. The rotor 17 is rotatably driven for sawing through the workpiece 47 by means of the drive motor 29 by the belt 28 and the hollow wheel 27. As has been explained in connection with FIG. 3, by rotation of the rotor 17 the axis of rotation 6 of the circular saw blade 34 is moved about the axis of rotation 35 that therefore travels the movement path 52. It is smaller than in case of sawing through the workpiece 47 according to FIG. 3. The movement path 52 is approximately 210°. The straight line 50 that characterizes the ready position assumes an 8 o'clock position. From here the sawing process is carried out. After one circulation of the axis of rotation 6 of the circular saw blade 34 about the axis of rotation 35 of the rotor 17 about the movement path 52, the circular saw blade 94 now drops downwardly out of the workpiece 47. This dropped position is again illustrated by the straight line 51.

Figure 5:
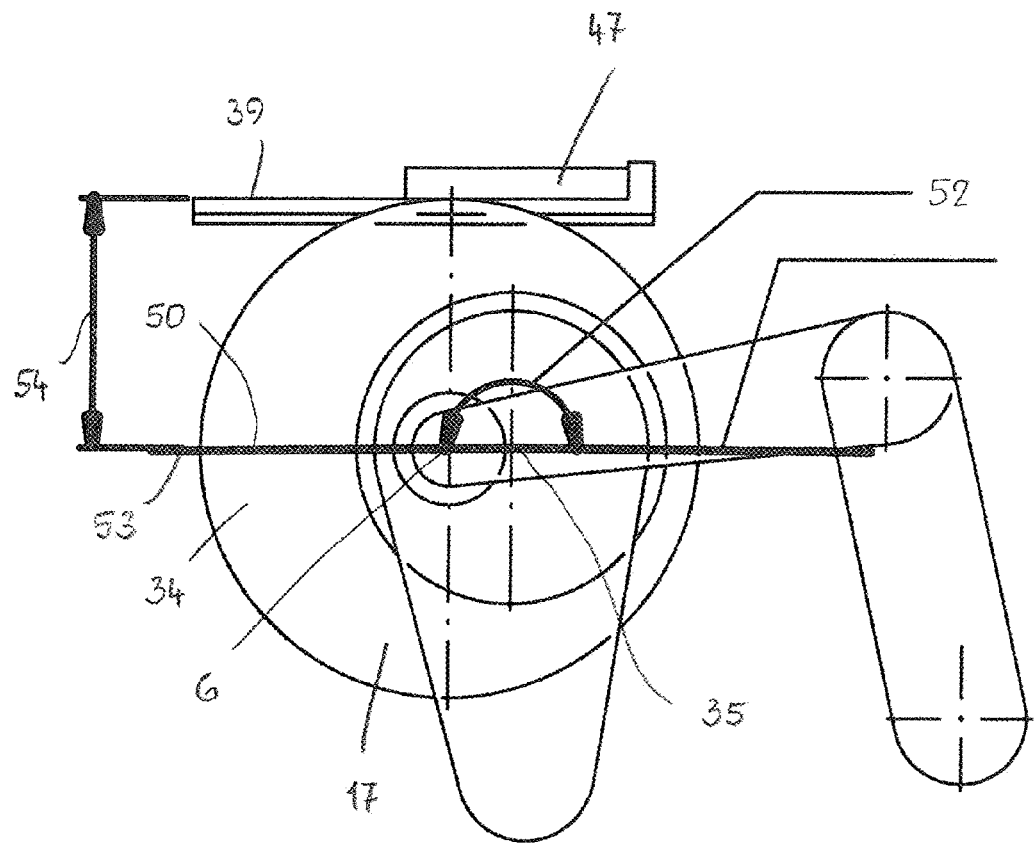
FIG. 5 a third ready position of the saw blade for workpieces with different cross-section sectional shape.

In the embodiment according to FIG. 5, a thin workpiece 47 is sawed through which is significantly thinner than the workpieces according to FIGS. 3 and 4. Accordingly, the sawing stroke for cutting through the workpiece 47 is smaller in comparison to the previous embodiments. The axis of rotation 6 of the circular saw blade 34 is adjusted relative to the axis of rotation 35 of the rotor 17 such that the spacing 54 of the axis of rotation 6 from the transport path 39 is correspondingly smaller. In the embodiment, the two axes of rotation 6, 35 are positioned in an exemplary fashion in a plane 53 that is extending parallel to the transport path 39. The circular saw blade 34 is positioned in the ready position again at the underside of the workpiece 47 to be sawed or has only a minimal spacing thereto. The straight line 50 which is indicating the ready position in this case is in a 9 o'clock position.

By rotation of the rotor 17 about its axis 35, the axis of rotation 6 of the rotating circular saw blade 34 is moved along the movement path 52 about the axis of rotation 35. Since the workpiece 47 is thin, only a correspondingly minimal stroke of the circular saw blade 34 perpendicular to the transport path 39 is required. After a movement about 180°, the circular saw blade 34 then again exits from the workpiece 47.

Figure 6:
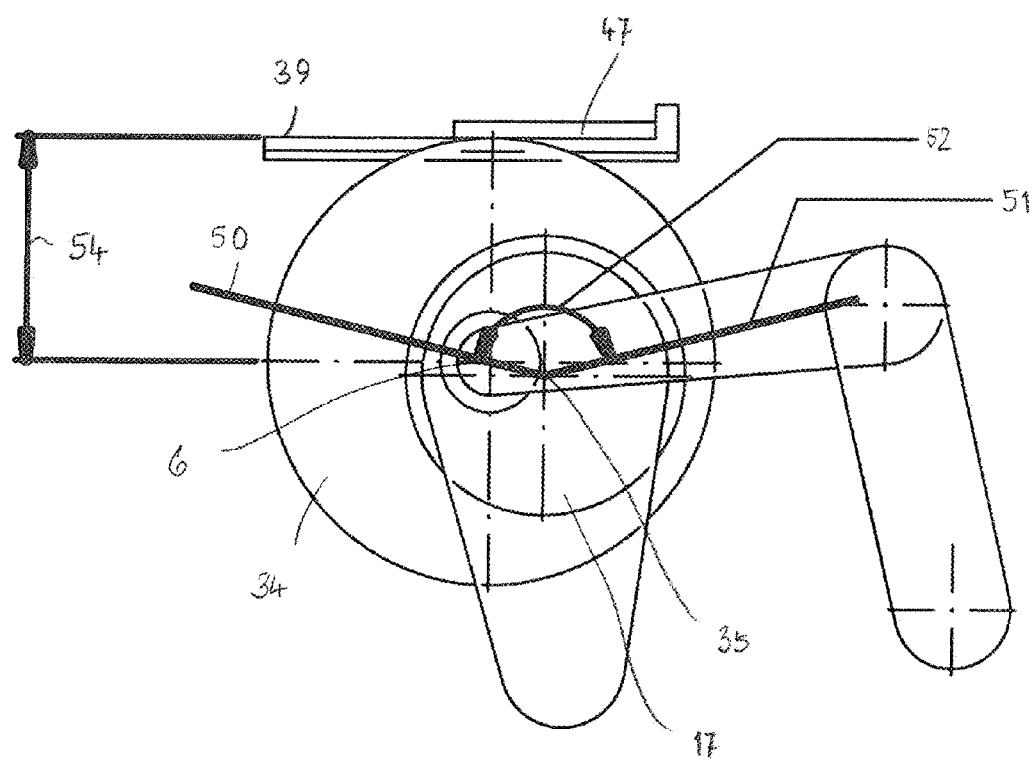
FIG. 6 a fourth ready position of the saw blade for workpieces with different cross-sectional shape.

With the aid of FIG. 6, the situation is described that by means of the circular saw blade 34 an even thinner workpiece 47 is to be sawed through. In this case, the axis of rotation 6 of the circular saw blade 34 is adjusted such that its spacing 54 from the transport path 39 in the ready position is smaller than in the embodiment according to FIGS. 3 to 5. The ready position of the circular saw blade 34 is again indicated by the straight line 50 which in this embodiment assumes a 10 o'clock position. The stroke that is to be carried out by the circular saw blade 34 during sawing through the workpiece 47 is smallest in this embodiment in comparison to the embodiments according to FIGS. 3 to 5. The movement path 52 of the axis of rotation 6 about the axis of rotation 35 of the rotor 17 is only approximately 150° before the circular saw blade 34 exits from the workpiece 47 (line 51).

The described embodiments show that the workpieces 47 depending on their thickness and/or width can be sawed through very effectively by means of the circular saw blade 34. The circular saw blade 34 is adjusted respectively such that the stroke of the circular saw blade 34 during the sawing process is minimal so that the workpieces 47 can be sawed through within a very short period of time.

After sawing through the workpiece 47, the circular saw blade 34 is then rotated back into its basic position while the next workpiece 47 is supplied. In this way, the circular saw blade 34 is immediately available for the next sawing cut when it is to be performed on the workpiece 47 or a following workpiece.

The adjustment of the saw blade 34 in different basic positions as a function of the width and/or thickness of the workpiece to be sawed is automatically carried out by a control unit to which the dimensions of the workpieces of a preceding measurement are transmitted. The workpieces 47 are measured in a known way during transport to the sawing apparatus and checked with regard to defects. They are recorded in a so-called cutting list which is transmitted to the control unit. Based on the parameters in the control unit the sawing process is carried out at the required locations of the workpiece 47. The control unit drives the drive motors 8, 29 for the rotor 17 as well as the saw blade 34. In this way, the saw blade 34 is optimally adjusted so that the sawing times are minimized.

There is the possibility to perform rotation of the rotor 17 not continuously but in a controlled fashion. This reduces the risk that splinter formation will occur at the workpiece to be sawed.

Instead of the belt drives for the rotor 17 and for the circular saw blade 34, gear drives can be used also, for example.

What is claimed is:

1. A sawing apparatus for sawing workpieces of wood, plastic material and the like, comprising:
   an adjustable frame part;
   a first drive motor;
   at least one circular saw blade operatively connected to the first drive motor and drivable in rotation by the first drive motor about an axis of rotation of the at least one circular saw blade;
   wherein the apparatus includes a mechanism for determining a ready position;
   wherein the at least one circular saw blade is adjustable from a ready position on one side of a workpiece support into a working position in engagement with a workpiece;
   wherein the circular saw blade is drivable through an angular travel cutting stroke beginning at said ready position to cut a workpiece in a controlled manner;
   wherein the ready position is selected as a function of a position of the adjustable frame part, and the adjustable frame part is capable of moving to the ready position before the angular travel cutting stroke, such that the at least one circular saw blade carries out a minimized angular travel as working travel during sawing.

2. The sawing apparatus according to claim 1, wherein the at least one circular saw blade in the ready position is positioned in an area below a transport path for workpieces through the sawing apparatus.

3. The sawing apparatus according to claim 1, further comprising a rotor, wherein the axis of rotation of the at least one circular saw blade is rotatably and eccentrically supported in the rotor and wherein the rotor has an axis of rotation parallel to the axis of rotation of the at least one circular saw blade.

4. The sawing apparatus according to claim 3, wherein a position of the at least one circular saw blade is adjustable in the ready position relative to the rotor.

5. The sawing apparatus according to claim 3, further comprising at least one belt drive operatively connecting the first drive motor and the at least one circular saw blade to each other for driving the at least one circular saw blade.

6. The sawing apparatus according to claim 5, further comprising at least one belt drive operatively connected to the rotor for driving the rotor.

7. The sawing apparatus according to claim 6, wherein the rotor comprises a hollow wheel and at least one endless belt of the at least one belt drive operatively connected to the rotor is guided across the hollow wheel.

8. The sawing apparatus according to claim 7, wherein the at least one belt drive operatively connecting the first drive motor and the at least one circular saw blade to each other is arranged in an area outside of the hollow wheel.

9. The sawing apparatus according to claim 5, further comprising at least one length-adjustable coupling unit connected to the axis of rotation of the at least one circular saw blade and to a shaft of the at least one belt drive operatively connecting the first drive motor and the at least one circular saw blade to each other.

10. The sawing apparatus according to claim 3, further comprising a control unit and further comprising a second drive motor operatively connected to the rotor, wherein the first and second drive motors are connected to the control unit.

11. The sawing apparatus according to claim 3, wherein a rotary speed of the rotor is controllable.

12. The sawing apparatus according to claim 1, wherein the adjustable frame part is pivotable about an axis parallel to the axis of rotation of the at least one circular saw blade.

13. A sawing apparatus for sawing workpieces of wood, plastic material and the like, comprising:
   an adjustable frame part;
   a first drive motor fastened to the adjustable frame part;
   at least one circular saw blade operatively connected to the first drive motor and drivable in rotation by the first drive motor about an axis of rotation of the at least one circular saw blade;

wherein the apparatus includes a mechanism for determining a ready position based on a cross-section of a workpiece;

wherein the at least one circular saw blade is adjustable from a ready position on one side of a workpiece support into a working position in engagement with a workpiece;

wherein the circular saw blade is drivable through an angular travel cutting stroke beginning at said ready position to cut a workpiece in a controlled manner;

wherein the adjustable frame part is adjustable at least in a vertical direction and/or in a horizontal direction transverse to the axis of rotation of the at least one circular saw blade as a function of a cross-section of a workpiece to be sawed to set the adjustable frame part in a ready position.

14. The sawing apparatus according to claim 13, wherein the at least one circular saw blade in the ready position is positioned in an area below a transport path for workpieces through the sawing apparatus.

15. The sawing apparatus according to claim 13, further comprising a rotor, wherein the axis of rotation of the at least one circular saw blade is rotatably and eccentrically supported in the rotor and wherein the rotor has an axis of rotation parallel to the axis of rotation of the at least one circular saw blade.

16. The sawing apparatus according to claim 15, wherein a position of the at least one circular saw blade is adjustable in the ready position relative to the rotor.

17. The sawing apparatus according to claim 16, further comprising at least one belt drive operatively connecting the first drive motor and the at least one circular saw blade to each other for driving the at least one circular saw blade.

18. The sawing apparatus according to claim 17, further comprising at least one belt drive operatively connected to the rotor for driving the rotor.

19. The sawing apparatus according to claim 18, wherein the rotor comprises a hollow wheel and at least one endless belt of the at least one belt drive operatively connected to the rotor is guided across the hollow wheel.

20. The sawing apparatus according to claim 19, wherein the at least one belt drive operatively connecting the first drive motor and the at least one circular saw blade to each other is arranged in an area outside of the hollow wheel.

21. The sawing apparatus according to claim 17, further comprising at least one length-adjustable coupling unit connected to the axis of rotation of the at least one circular saw blade and to a shaft of the at least one belt drive operatively connecting the first drive motor and the at least one circular saw blade to each other.

22. The sawing apparatus according to claim 15, further comprising a control unit and further comprising a second drive motor operatively connected to the rotor, wherein the first and second drive motors are connected to the control unit.

23. The sawing apparatus according to claim 15, wherein a rotary speed of the rotor is controllable.

24. The sawing apparatus according to claim 13, wherein the adjustable frame part is pivotable about an axis parallel to the axis of rotation of the at least one circular saw blade.

* * * * *

UNITED STATES PATENT AND TRADEMARK OFFICE
CERTIFICATE OF CORRECTION

PATENT NO. : 9,873,157 B2  
APPLICATION NO. : 15/088214  
DATED : January 23, 2018  
INVENTOR(S) : Heinz et al.

Page 1 of 1

It is certified that error appears in the above-identified patent and that said Letters Patent is hereby corrected as shown below:

On the Title Page

Item (72) Inventor is corrected to read:
-- Alois Heinz, Unterroth, (DE);
Georg Reinbold, Biberach (DE);
Thomas Schmid, Langenau (DE);
Herbert Locherer, Laupheim (DE) --.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*